Figure 1:
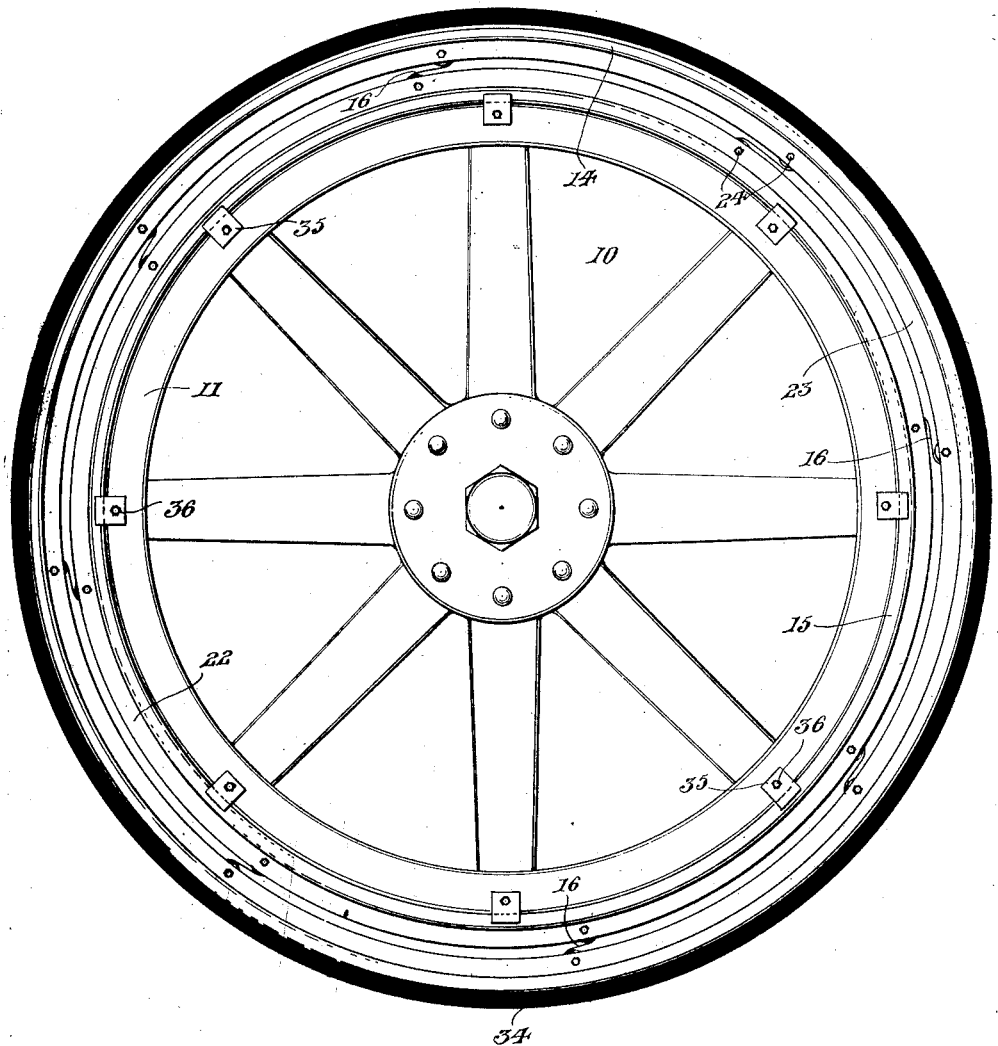

F. PATAYE.
DEMOUNTABLE METAL TIRE FOR AUTOMOBILES.
APPLICATION FILED JAN. 23, 1920.

1,343,840.

Patented June 15, 1920.
2 SHEETS—SHEET 1.

Inventor
F. Pataye

By A. M. Wilson
Attorney

F. PATAYE.
DEMOUNTABLE METAL TIRE FOR AUTOMOBILES.
APPLICATION FILED JAN. 23, 1920.
1,343,840.
Patented June 15, 1920.
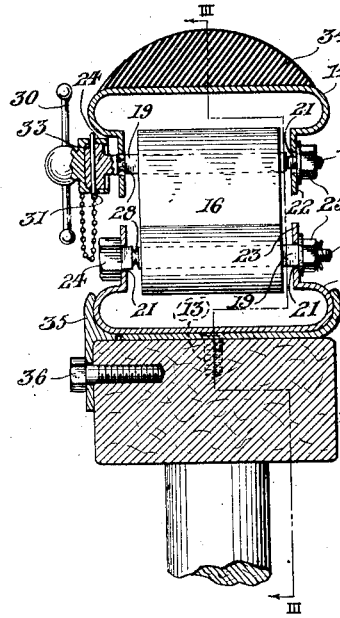
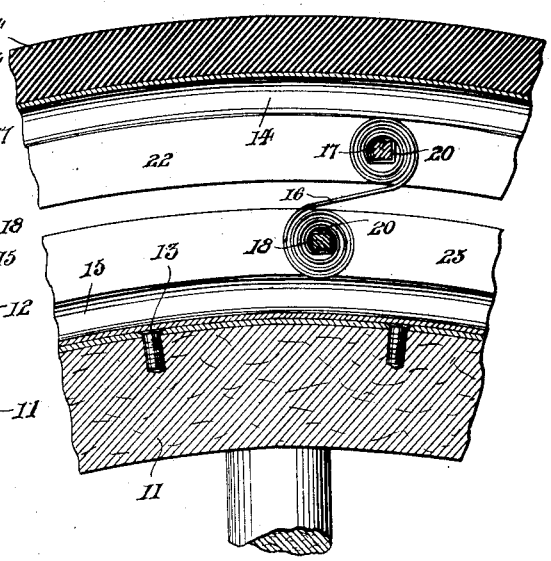
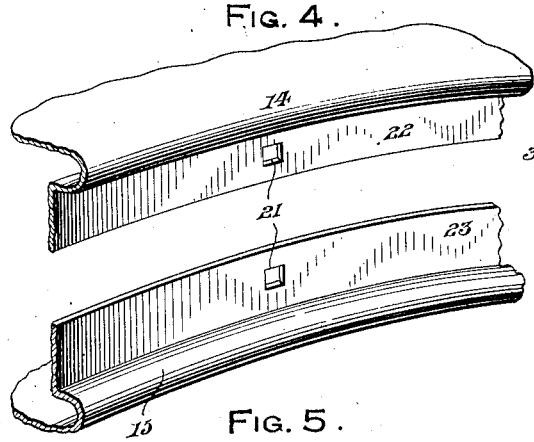
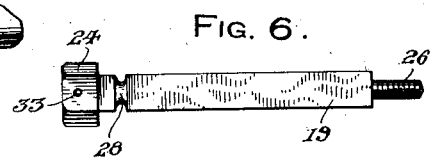
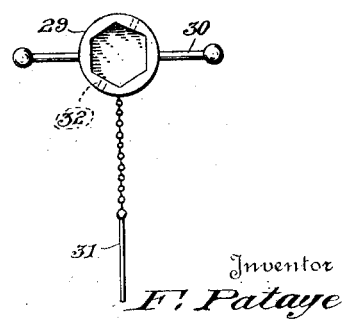
Inventor
F. Pataye

UNITED STATES PATENT OFFICE.

FRANK PATAYE, OF GARDENVILLE, NEW YORK.

DEMOUNTABLE METAL TIRE FOR AUTOMOBILES.

1,343,840.

Specification of Letters Patent.    Patented June 15, 1920.

Application filed January 23, 1920. Serial No. 353,545.

*To all whom it may concern:*

Be it known that I, FRANK PATAYE, a citizen of the United States of America, residing at Gardenville, in the county of Erie and State of New York, have invented certain new and useful Improvements in Demountable Metal Tires for Automobiles, of which the following is a specification.

The primary object of the present invention is the provision of a substitute for pneumatic tires in the way of a demountable metal tire adapted for removable positioning upon the felly and rim of an automobile wheel whereby double expansion is afforded and the resiliency of the tire is capable of adjustment.

A further object of the invention is to provide a resilient tire that is cheap in construction, serviceable and puncture-proof having shock-absorbing properties, possessing great strength and capable of long use without the necessity of repairs or replacement.

With these general objects in view, the invention consists of the novel combination and arrangement of parts hereinafter more fully described in connection with the accompanying drawings, and in which like reference characters designate corresponding parts throughout the several views.

In the drawings,

Figure 1 is an elevational view of a wheel provided with my demountable metal tire, Fig. 2 is a transverse sectional view through the felly, rim, and tire upon a slightly enlarged scale, Fig. 3 is a longitudinal sectional view taken upon line III—III of Fig. 2, Fig. 4 is an elevational view of a side portion of the outer rim of the tire, Fig. 5 is a similar view of the inner tire member or rim, Fig. 6 is a side elevation of one of the spring-mounting bolts, and Fig. 7 is an elevational view of a socket wrench adapted for employment in adjusting the tire bolts.

Referring more in detail to the drawings, I have illustrated a wheel 10 having a felly 11 upon which a rim section 12 is secured by screws 13, one side flange of the rim 12 being omitted.

My tire broadly consists of an outer rim 14 and an inner rim 15, resiliently connected together by S-shaped springs 16 adjustably secured to the rims 14 and 15, by bolts 17 and 18, carried by the rims 14 and 15, respectively. The bolts 17 and 18 are identical in construction each having a squared shaft 19 to which the adjacent ends 20 of the spring 16 are secured with the end portions of the spring surrounding the bolts, and the rims 14 and 15 resiliently connected together in this manner.

The shanks 19 of the bolts 17 and 18 are normally positioned through rectangular openings 21 in the opposite flanges 22 and 23 of the rims 14 and 15 respectively and whereby the bolts are maintained against turning upon the adjustment of the spring 16. A head 24 upon corresponding ends of the bolts 17 and 18 normally engages the adjacent side flange of the carrying rim while a nut 25 is threaded upon the opposite reduced end 26 of the bolt for locking the bolt with its squared shank 19 through the flange perforations 21.

The ends 20 of the springs 16 are in the form of rectangular tubes through which the bolts 17 and 18 are slidably positioned, with close enough fit to anchor the ends of the springs to the said bolts. A reduced portion or neck 28 spaced from the head 24 of each bolt, permits the turning of the bolt in either direction when longitudinally shifted with the neck 28 within the adjacent flange perforation 21. Upon releasing the nut 25 of either of the bolts 17 and 18, the bolt may be shifted longitudinally with the reduced threaded portion 26 of the bolt within the perforation 21 at the adjacent side of the tire rim and with the neck 28 within the perforation 21 at the opposite side of the same rim member as best illustrated in connection with the bolt 17, in Fig. 2 of the drawings. The socket wrench 29 may then be applied to the bolt-head 24 for turning in either direction desired by the handle 30 of the wrench, thereby adjusting the outer portion of the spring 16. When the suitable adjustment has been reached, the bolt 17 is again shifted longitudinally bringing the head 24 against the adjacent rim flange 22 with the squared shank 19 through the perforations 21 and maintaining the bolt against revolution while the nut 25 is tightened for locking the bolt in position.

A pin 31 is connected to the socket 29 for passing through a perforation 32 in the socket and a transverse perforation 33 in the bolt-head 24 for removably securing the wrench to the bolt when desired, for operation. Both of the bolts 17 and 18 being adjustable in this manner, it will be seen that the springs are readily adjusted to such tension as may be desired for rendering the wheel capable of resiliently supporting the load carried thereby. With my tire installed upon a wheel 10, a substantially floating hub is provided for supporting the load, a rubber tread surface 34 being preferably provided upon the outer face of the tire rim 14, the construction of my tire permitting the same to be readily mounted upon and removed from the rim section 12 while suitable clips or blocks 35 attached to the felly 13 by screws 36 and bear against the adjacent side of the tire rim 15, retaining the tire in position upon the rim 12.

While the form of the invention herein set forth is believed to be the preferable embodiment thereof, it is nevertheless to be understood that minor changes may be made in the form, combination and arrangement of parts without departing from the spirit and scope of the invention as claimed.

What I claim as new and desire to secure by Letters Patent is:—

A tire comprising concentric rims having inwardly projecting opposed flanges, bolts arranged in pairs, and the bolts of each pair mounted adjacent each other on opposed flanges, and springs coiled at their opposite ends with the coils surrounding and secured to said bolts, the tension of said springs being increased when the rims move relatively to each other in one direction to tighten the convolutions of the coiled ends of the springs.

In testimony whereof I affix my signature.

FRANK PATAYE.

Witnesses:
 STEPHEN G. CLAYBACK,
 NIKOLAUS HEUSINGER.